(12) United States Patent
Ciacci et al.

(10) Patent No.: US 8,964,904 B2
(45) Date of Patent: Feb. 24, 2015

(54) RECEIVER FILTER FOR DC-WANDER REMOVAL IN A CONTACTLESS SMARTCARD

(71) Applicant: NXP B.V., Eindhoven (NL)

(72) Inventors: Massimo Ciacci, Eindhoven (NL); Remco Cornelis Herman van de Beek, Eindhoven (NL); Ghiath Al-Kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 13/735,780

(22) Filed: Jan. 7, 2013

(65) Prior Publication Data

US 2014/0192934 A1    Jul. 10, 2014

(51) Int. Cl.
| | |
|---|---|
| H04L 27/22 | (2006.01) |
| H04B 1/16 | (2006.01) |
| H04L 25/03 | (2006.01) |
| H04L 25/06 | (2006.01) |
| H04B 1/00 | (2006.01) |

(52) U.S. Cl.
CPC ........ *H04B 1/16* (2013.01); *H04L 25/03* (2013.01); *H04L 25/06* (2013.01); *H04B 1/0003* (2013.01)
USPC ........... 375/329; 375/316; 375/322; 375/346; 375/350

(58) Field of Classification Search
CPC ...... H04L 25/03; H04L 25/06; H04B 1/0003; H04B 1/16
USPC .......................... 375/329, 316, 322, 346, 350
See application file for complete search history.

(56) References Cited

U.S. PATENT DOCUMENTS

| | | | |
|---|---|---|---|
| 4,696,056 A | 9/1987 | Morita | |
| 6,288,856 B1 * | 9/2001 | Ottesen et al. | 360/31 |
| 7,446,685 B1 * | 11/2008 | Kikugawa et al. | 341/142 |
| 8,279,955 B1 * | 10/2012 | Zhao et al. | 375/260 |
| 8,400,224 B1 * | 3/2013 | Au et al. | 330/311 |
| 2004/0169945 A1 * | 9/2004 | Hiura et al. | 360/39 |
| 2007/0291884 A1 * | 12/2007 | Frederick et al. | 375/350 |
| 2008/0089443 A1 * | 4/2008 | Sanada et al. | 375/319 |
| 2009/0212983 A1 * | 8/2009 | Fukuzawa et al. | 341/142 |
| 2010/0061488 A1 * | 3/2010 | Endres et al. | 375/326 |
| 2010/0128773 A1 * | 5/2010 | Fukuda et al. | 375/232 |
| 2012/0133414 A1 | 5/2012 | Zhuang | |

OTHER PUBLICATIONS

Very high bit rates (VHBR), Committee Draft ISO/IEC 14443.4:2008/AM2 and ISO/IEC 14443-2:2010/AM1 (http://wg8.de/sd1.html#14443), Apr. 19, 2012.

(Continued)

*Primary Examiner* — Kenneth Lam (57) ABSTRACT

Embodiments of a method for processing a baseband signal in a Direct Current (DC)-suppressed system, a system for processing a baseband signal in a DC-suppressed system, and a smart card are described. In one embodiment, a method for processing a baseband signal in a DC-suppressed system involves processing the baseband signal in the analog domain with a first high pass filter (HPF), converting the processed baseband signal to a digital signal, and processing the digital signal in the digital domain with a second HPF to provide a discrete-time differentiation of the baseband signal. Other embodiments are also described.

15 Claims, 8 Drawing Sheets

(56) References Cited

OTHER PUBLICATIONS

R.C.H. Va De Beek et al.; "A 13.56Mbps PSK receiver for 13.56MHz RFID applications"; Radio Frequency Integrated Circuits Symposium (RFIC); IEEE Conference Jun. 17-19, 2012; p. 239-242.

G. Al-Kadi et al.; "A 13.56Mbps PSK receiver for very high data rate 13.56MHz smart card and NFC applications"; Consumer Electronics (ICCE); 2012 IEEE International Conference Jan. 13-16, 2012; p. 180-182.

* cited by examiner

RECEIVER FILTER FOR DC-WANDER REMOVAL IN A CONTACTLESS SMARTCARD

A smart card includes embedded integrated circuits that can be used to store information and perform data processing. For example, a portable smart card can be used in financial, transportation, security, healthcare, or other applications to provide identification and authentication. Types of smart cards include contact smart cards that communicate via electrical contacts or contactless smart cards that communicate wirelessly. For example, a contactless smart card may communicate with and be powered by a smart card reader through electromagnetic induction. In some cases, a contactless smart card does not include an internal power source but uses an inductor as its antenna to capture an electromagnetic interrogation signal to power the card's electronic circuits.

In addition to an antenna, a transceiver circuit of a contactless smart card typically includes an analog front-end for processing and converting received analog baseband signals into digital signals. Typically, a High Pass Filter (HPF) is used in a receiver signal path preceding an analog-to-digital converter (ADC) of the analog frontend to suppress Direct Current (DC). However, the HPF usually introduces or intensifies Inter Symbol Interference (ISI) into the receiver signal path. For example, a phase lock loop (PLL) can be inserted in the signal path of a Differential phase-shift keying (DPSK) demodulator to obtain coherent demodulation, resulting in a HPF on the phase signal. In another example, an HPF such as an Alternative Current (AC) coupled Amplitude-shift keying (ASK) demodulator can be used to suppress DC. However, both the PLL and the AC coupled ASK demodulator can introduce time domain distortions in the form of DC-wander, which can be seen as long memory ISI. Such time domain distortions can be minimized by reducing the cut-off frequency of the HPF and inserting a discrete-time digital differentiator (with a Z-transfer $H(Z)=1-Z^{-1}$) immediately after the ADC. However, reducing the cut-off frequency of the HPF and inserting a differentiator immediately after the ADC may result in analog components that have a large dimension and are therefore expensive. In addition, it is difficult to design a transceiver architecture that can accommodate the required analog components.

Embodiments of a method for processing a baseband signal in DC-suppressed system, a system for processing a baseband signal in a DC-suppressed system, and a smart card are described. In one embodiment, a method for processing a baseband signal in a DC-suppressed system involves processing the baseband signal in the analog domain with a first high pass filter (HPF), converting the processed baseband signal to a digital signal, and processing the digital signal in the digital domain with a second HPF to provide a discrete-time differentiation of the baseband signal. Compared to traditional techniques that rely exclusively on performing differentiation in the digital domain, performing differentiation partially in the analog domain and partially in the digital domain can remove DC wander distortion and reduce phase noise.

In one embodiment, a method for processing a baseband signal in a DC-suppressed system involves processing the baseband signal in the analog domain with a first HPF, converting the processed baseband signal to a digital signal, and processing the digital signal in the digital domain with a second HPF to provide a discrete-time differentiation of the baseband signal.

In one embodiment, a system for processing a baseband signal in a DC-suppressed system includes a first HPF configured to process the baseband signal in the analog domain, an ADC configured to convert the processed baseband signal to a digital signal, and a second HPF configured to process the digital signal in the digital domain to provide a discrete-time differentiation of the baseband signal.

In one embodiment, a smart card includes an antenna configured to receive a wireless signal, an analog front-end configured to process the wireless signal and to convert the wireless signal into a digital signal, a digital signal processing (DSP) unit configured to perform digital signal processing on the digital signal, and a processor configured to process the digital signal from the DSP unit according to one or more protocols. The analog front-end includes a demodulator configured to demodulate the wireless signal into a baseband signal, a first HPF configured to process the baseband signal in the analog domain, and an ADC configured to convert the processed baseband signal to the digital signal. The DSP unit includes a second HPF configured to process the digital signal in the digital domain to provide a discrete-time differentiation of the baseband signal.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
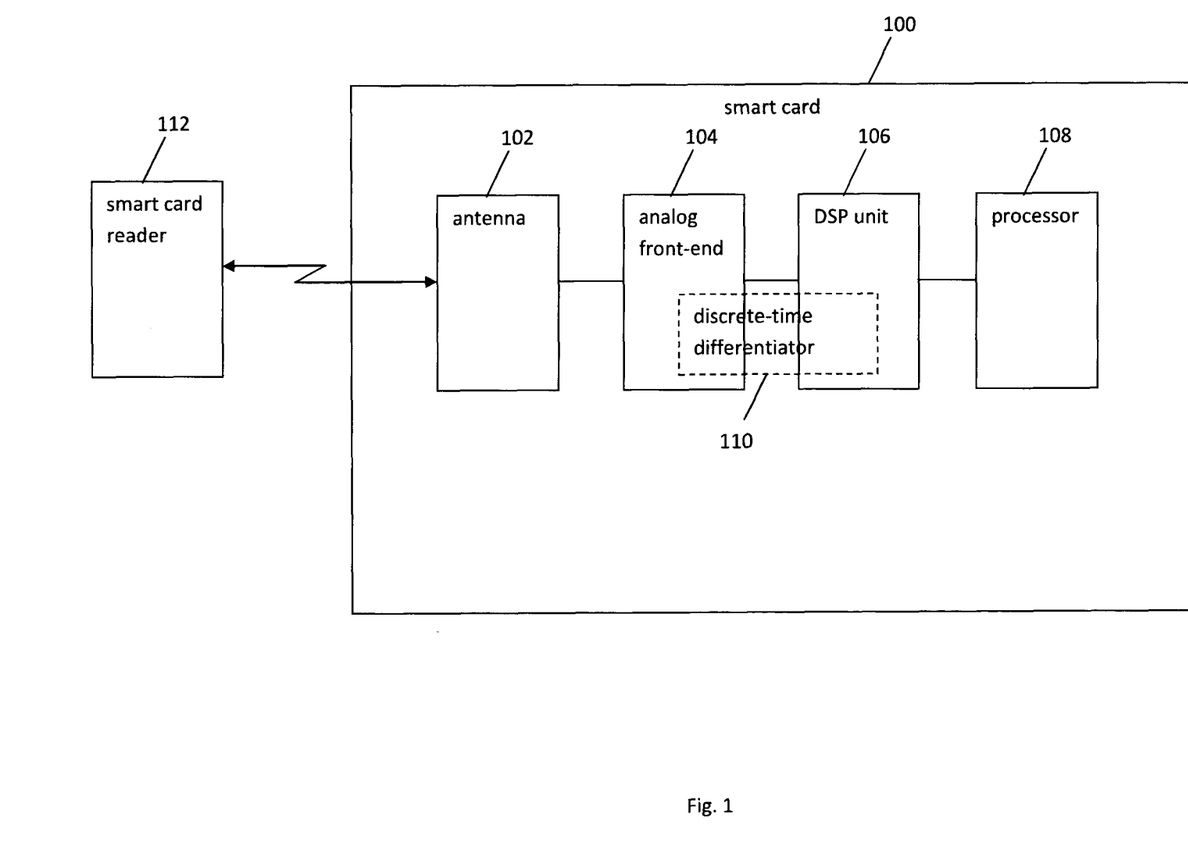
FIG. 1 is a schematic block diagram of a smart card in accordance with an embodiment of the invention.

FIG. 1 is a schematic block diagram of a smart card 100 in accordance with an embodiment of the invention. The smart card can be used in financial, transportation, security, healthcare, or other applications to store information and perform data processing. In some embodiments, the smart card has the ability to securely manage, store and provide access to data on the card, perform on-card functions, such as encryption, authentication, and authorization, and interact intelligently with a smart card reader 112. The smart card can be included in a computing device, such as a smartphone, a tablet computer, a laptop, etc. In the embodiment depicted in FIG. 1, the smart card is a contactless smart card that communicates wirelessly using magnetic or electromagnetic fields. The data exchange between the smart card and the smart card reader is achieved using the magnetic or electromagnetic fields without the use of electrical contacts between the smart card and the smart card reader. In an embodiment, the smart card is used in Near field communication (NFC) applications.

In the embodiment depicted in FIG. 1, the smart card 100 includes an antenna 102, an analog front-end 104, a digital signal processing (DSP) unit 106 and a processor 108. The smart card may be designed to be compatible with the International Organization for Standardization (ISO)/the International Electrotechnical Commission (IEC) 14443.

The antenna 102 of the smart card 100 is configured to receive wireless signals from, for example, the smart card reader 112. The antenna can communicate via magnetic or electromagnetic fields. The antenna may be an NFC antenna. In an embodiment, the antenna is an inductor type antenna that captures an interrogation signal from the smart card reader to power the analog front-end 104, the DSP unit 106, and/or the processor 108.

The analog front-end 104 of the smart card 100 is configured to process and convert the received analog signals from the antenna 102 into digital signals. The analog front-end 104 operates in the analog domain and processes analog signals. Components of the analog front-end 104 include, but are not limited to, one or more demodulators, PLLs, ADCs, and carrier recovery units.

The DSP unit 106 of the smart card 100 is configured to perform digital signal processing on digital signals from the analog front-end 104. The DSP unit 106 operates in the digital domain and processes digital signals. Components of the DSP unit 106 include, but are not limited to, one or more receiver filters, automatic gain control (AGC) modules, sample timing units, and digital equalizers.

The processor 108 of the smart card 100 is configured to process digital signals from the DSP unit 106 according to one or more protocols. The processor can be a microprocessor such as a central processing unit (CPU) that provides microinstruction and data processing capability for the mobile communication device. The processor may include a multifunction processor and/or an application-specific processor. Examples of the processor include the ATOM family of processors by INTEL, and the Ax family of processors from APPLE, and Advanced RISC Machine (ARM) based processors. Examples of the protocols that can be used by the processor include, but are not limited to, one or more communication protocol stacks, cryptographic protocols, and data compression protocols. The smart card 100 may include physical memory that is accessible by the DSP unit 106 and the processor.

In the embodiment depicted in FIG. 1, some components of the analog front-end 104 and the DSP unit 106 form a discrete-time differentiator 110 in which the differentiation is done partially in the analog domain and partially in the digital domain. The differentiation is a process of finding a derivative of a signal, which can be a continuous signal or a discrete signal. The derivative is a measure of how the signal changes as its parameter, such as time or index, changes. For example, a discrete-time differentiated signal, "X'(n)," (n is a positive integer) of a discrete-time input signal, "X(n)," can be expressed as:

$$X'(n)=X(n)-X(n-1). \qquad (1)$$

In this example, The discrete-time differentiator 110 has a Z-transfer $H(Z)=1-Z^{-1}$. Compared to traditional approaches that rely exclusively on performing differentiation in the digital domain, performing differentiation partially in the analog domain and partially in the digital domain can completely remove DC wander distortions, which are due to the suppression of the low frequency signal component. In addition, performing differentiation in both the analog domain and the digital domain can significantly reduce and whiten all low frequency noise, such as phase noise and all 1/f-like noise sources of the analog front-end 104. Further, performing differentiation in both the analog domain and the digital domain does not require a crystal oscillator, which is bulky and cost prohibitive for smartcard applications.

Figure 2:
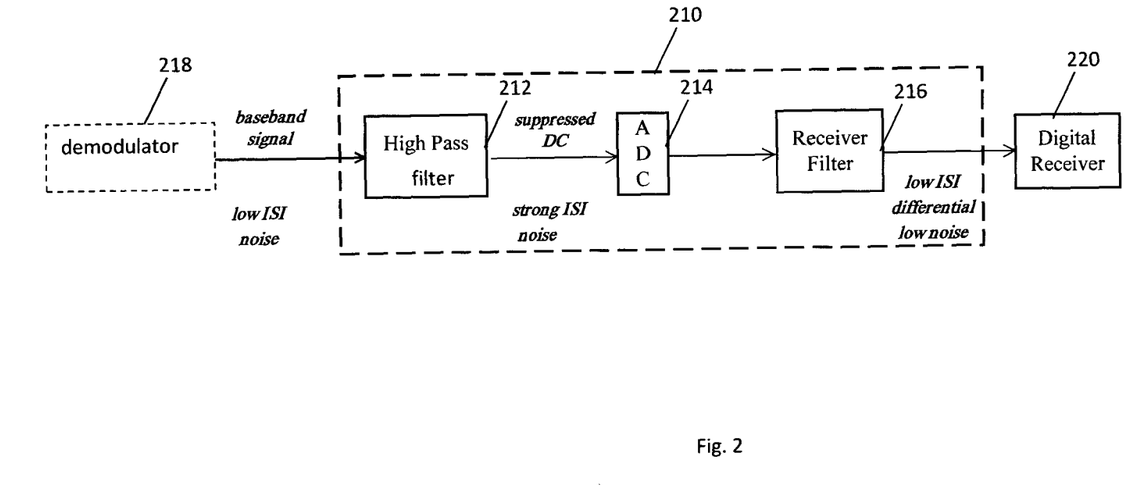
FIG. 2 depicts an embodiment of a Mixed Signal (partial analog, partial digital) discrete-time of the smart card depicted in FIG. 1.

Turning now to FIG. 2, components of a discrete-time differentiator 210, which is representative of the discrete-time differentiator 110 depicted in FIG. 1, are shown. In the embodiment depicted in FIG. 2, the discrete-time differentiator 210 includes a high pass filter (HPF) unit 212, an ADC 214, and a receiver filter 216. The HPF unit and the ADC are components of the analog front-end 104 while the receiver filter is a component of the DSP unit 106. The HPF unit is configured to process a baseband signal from, for example, a demodulator 218. The ADC is configured to convert an analog signal from the HPF unit into a digital signal. The receiver filter is a high pass filter that may be used in the beginning of a digital receiver chain. In the embodiment depicted in FIG. 2, the signal from the receiver filter 216 is outputted to a digital receiver 220, which is a component of the DSP unit. In some embodiments, the receiver filter 216 is located at the beginning of the signal path in the DSP unit.

In the embodiment depicted in FIG. 2, the baseband signal received at the HPF unit 212 typically does not have a DC-balanced waveform. In other words, the DC component (also known as the DC bias, the DC offset, or the DC coefficient) of the baseband signal, which is the mean amplitude of the waveform of the baseband signal, is not zero. The DC component is usually undesirable because it can cause saturation or a change in the operating point of an amplifier. To avoid voltage imbalance between connected components, a DC-balanced waveform, which is a waveform without a DC component, is desirable in a communications system. In the embodiment depicted in FIG. 2, the HPF unit is used to suppress the DC component of the baseband signal. Because the baseband signal received at the HPF unit 212 typically does not have a DC-balanced waveform, the baseband signal usually includes Inter Symbol Interference (ISI). In the embodiment depicted in FIG. 2, the ISI of the baseband signal can have different origins, e.g., due to wrong timing, or physical channel or demodulator response. The processing of the baseband signal in the HPF unit can introduce time domain distortions in the form of DC-wander, which can be seen as long memory ISI.

In an exemplary operation of the discrete-time differentiator 210, the HPF unit processing a baseband signal in the analog domain with a first HPF, for example, to suppress the DC component of the baseband signal. The ADC 214 converts the processed baseband signal into a digital signal. The receiver filter 216 processed the digital signal in the digital domain with a second HPF to provide a discrete-time differentiation of the baseband signal. The receiver filter 216 transforms the analog system response of the HPF unit 212 into a discrete-time differential response.

The receiver filter 216 can reduce or minimize ISI after the HPF. ISI is a systematic error, which is a function of the transmitted data and the channel frequency response being not flat, or not being perfectly discrete-time differential. In general, after the HPF unit 212, the DC component is suppressed and the signal already has a partial differentiation and the receiver filter can complete the differentiation in the digital domain. The receiver filter completes the differentiation by compensating at least one undesired system pole in a transfer function (e.g., the Laplace transfer function or the Z transfer function), of the HPF unit, leaving only the zero at the DC component. As is known in the art, in the Fourier transform, Laplace transform or Z-transform, such transfer is obtained by simple multiplication. However, in the non transformed domain (e.g., the time domain), such transfer is obtained via linear convolution. In this way, the DC wander effect as well as the ISI can be removed. The use of the receiver filter makes it possible to cope with DC wander without disrupting the system response, thereby enabling further adaptive equalization. For example, the resulting signal can be further equalized for the physical channel distortions (e.g., non linear ISI). However, if the baseband signal from the demodulator has negligible ISI, the DSP unit may consist of a simple slicer in addition to the receiver filter. If the baseband signal from the demodulator has considerable ISI, the DSP unit may include an equalizer that compensates for the channel ISI alone, which is made clearly visible by removal of DC wander via the preceding receiver filter.

In an embodiment, the receiver filter 216 transforms the HPF unit 212 into a close-to-perfect discrete-time differentiator, by only compensating (i.e., removing or masking) the dominant pole of the HPF, which is the pole with the lowest time constant, and using the already existing transfer zero at DC to act as the differentiator. In this embodiment, this single pole is compensated by a single zero because the receiver filter has a single coefficient. For example, the receiver filter can be a finite impulse response (FIR) with a transfer function $H(Z)=1-bZ^{-1}$, where b is $Z_{poleDominant}$. The receiver filter can convert the transfer function of the HPF into that of a discrete-time differentiator by suppressing at least one low frequency pole of the HPF. The receiver filter can reduce the dominant phase noise from the analog front-end by 10 dB and make the signal spectrum fit for further adaptive equalization.

Compared with traditional approaches that perform differentiation in the analog domain exclusively, using a discrete-time differentiator formed by the HPF unit 212 and the receiver filter 216 can optimally remove ISI introduced by the HPF inserted into a demodulator signal path preceding the ADC. More specifically, for phase-shift keying (PSK), the receiver filter optimally removes ISI introduced by PLL based DPSK demodulation, where the PLL is within the signal path. Compared to an expensive and difficult to implement low-bandwidth PLL that must be followed by differentiation, the receiver filter is easier and less expensive to implement. In addition, Zhuang (U.S. Pat. App. Pub. No. 2012/0133414) discussed reconstructing the DC component in the analog domain by a DC level shifter. Compared to the approach discussed in Zhuang, using the receiver filter to transform the HPF unit into a discrete-time differentiator can reliably remove ISI introduced by the HPF. Further, the receiver filter can significantly reduce noise levels (e.g., the phase noise level) from the PLL and make the noise spectrum closer to white, which is beneficial for a subsequent adaptive equalizer. Moreover, the receiver filter can be simple to implement, for example, by a single digital multiplier. Additionally, compared to a pure differentiator, quantization noise enhancement is smaller using the receiver filter.

The receiver filter 216 can be used in a DC-suppressed system that is widely used to transmit DC-balanced signals with zero DC component. A DC-suppressed system includes both an AC-coupled system (where a physical series cap blocks the DC), or a coherent phase demodulation system in which the phase DC is suppressed by mix down operation. An AC coupled system can be a system that includes AC-coupled electrical components, e.g., a series of capacitors used to filter out DC currents. DC Suppressing sometimes is desired (e.g., in AC coupling, ASK, where DC contains no information). DC suppressing sometimes is an unavoidable effect (e.g., coherent demodulation, PLL). If a DC-suppressed/DC-blocking system is used with a signal containing a DC component, e.g., a long run of ones, then long transients can appear at the AC coupling output. One example of such carrier systems is a coherent PSK demodulation system that includes a PLL directly inserted into the signal path after the demodulator or within the demodulator itself. The receiver filter can be used in high bit rate ISO14443-type systems, for example, mobile NFC applications or smartcard applications, that require a low-power proximity integrated circuit card (PICC).

Figure 3:
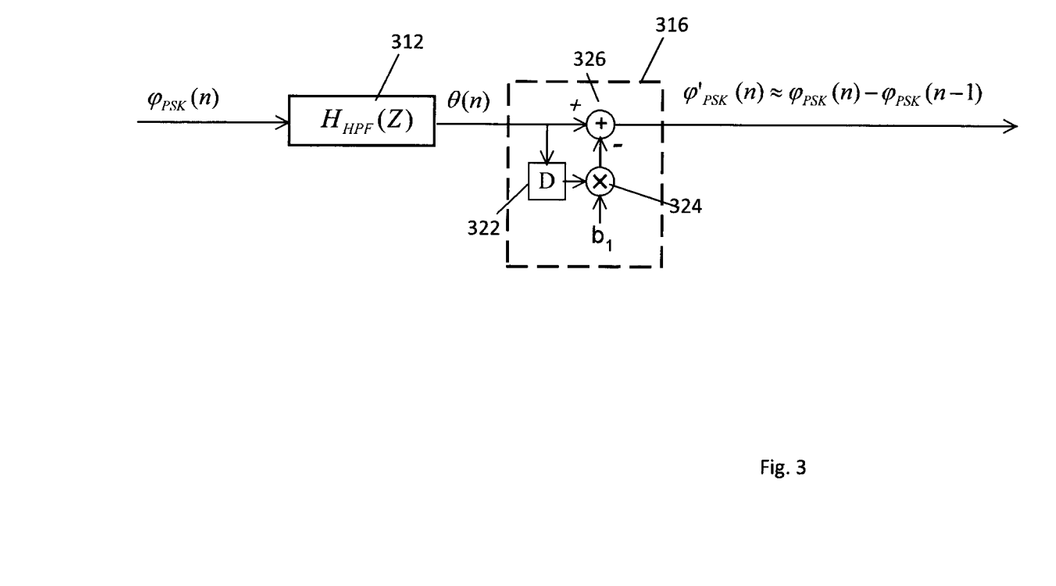
FIG. 3 depicts an embodiment of a receiver filter that is used to implemented the differentiator depicted in FIG. 2.

Turning now to FIG. 3, an example implementation of the receiver filter 216 is shown. In the embodiment depicted in FIG. 3, a receiver filter 316 is implemented as a digital FIR filter. As is known in the art, a FIR filter is a filter whose impulse response is of finite duration and settles to zero in finite time. In some embodiments, the receiver filter 316 is a single zero FIR filter with a single tap delay and a single coefficient, which can be implemented with a low cost.

In the embodiment depicted in FIG. 3, the FIR filter 316 includes a delay element (e.g., a sample delay line) 322, a multiplier 324 with a multiplying coefficient or filter tap, "$b_1$," and an adder 326. In an example operation, a PSK demodulated signal, "$\phi_{PSK(n)}$," is transformed by the HPF 312, "$H_{HPF}(Z)$," which may be a discrete-time representation of the analog HPF 212, into a sample signal, "$\emptyset(n)$," wherein n is a positive integer. The input sample, "Ø(n)," is inputted into the delay element 322. The delayed input sample is multiplied by the coefficient and the multiplication result is added with the input sample, "Ø(n)," to get the differentiated signal, "Ø'$_{PSK}$(n)." The differentiated signal, "Ø'$_{PSK(n)}$," can be expressed as:

$$\varnothing'_{PSK}(n) \approx \varnothing_{PSK}(n) - \varnothing_{PSk}(n-1). \quad (2)$$

The FIR filter 316 has a single tap, which is a single coefficient/single delay element pair. The filter tap, b1, of the FIR filter 316 is equal to the pole to be cancelled on the Z-plane. In an embodiment, the filter tap can be expressed as:

$$b1 = \exp(pPLL * Ts), \quad (3)$$

where pPLL is the PLL transfer function pole, in the Laplace domain, which defines the PLL bandwidth, and Ts is the sample time defined by the ADC clock rate.

In an embodiment, the receiver filter 316 is used in a PSK demodulation system. In this case, the receiver filter is applied to the HPF of a PLL, and is regarded as a PLL equalizer. In traditional PSK demodulation systems, the ISI distortion introduced by the PSK demodulator is only partly removed by a differentiation in the analog domain. Typically, reducing the PLL bandwidth to, for example, less than 1/100 of the symbol rate is used to further remove the ISI distortion. However, such low bandwidth results in large and therefore expensive loop filter components in the PLL. Moreover, the ISI distortion would not be completely removed, which poses a problem for a higher order PSK modulation such as 8-PSK or 16-PSK that requires margin for other noise sources and additional distortions from the channel. For example, the error from DC wander alone can be larger than a symbol interval, which results in bit errors. Compared to traditional PSK demodulation systems, using the receiver filter to provide a digital compensation can remove the ISI, achieve the needed differentiation and reduce the noise sources of the analog front-end.

Figure 4A:
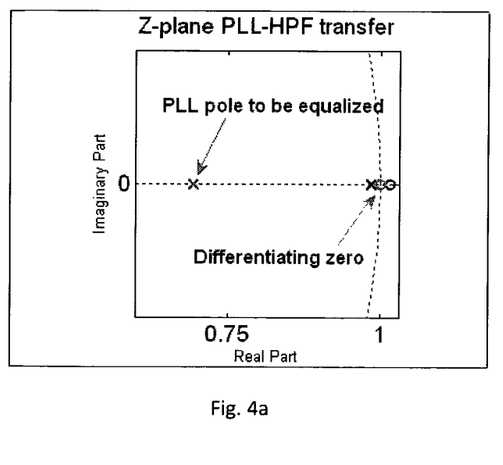
FIG. 4*a* and FIG. 4*b* show examples of responses in the z-transform domain of an HPF from a phase lock loop (PLL) and its equalized response from a PLL equalizer.
Figure 4B:
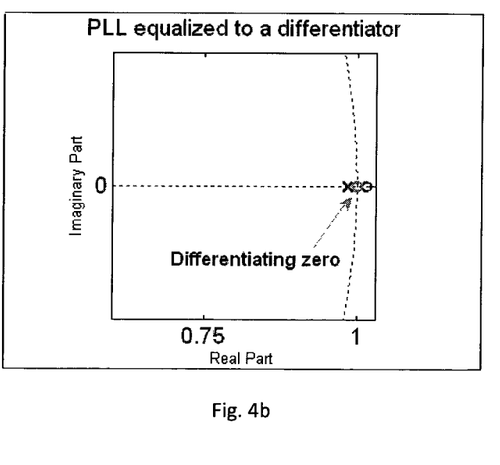
Figure 5:
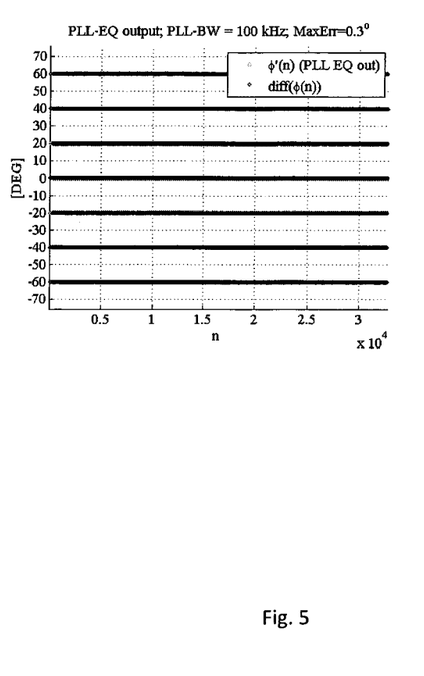
FIG. 5 shows some examples of residual errors of a PLL equalizer.

Examples of responses in the domain of the z-transform of a PLL that is used as the HPF, and its equalized version, approximating a pure time discrete differentiator are shown in FIG. 4a and FIG. 4b, respectively. In the zero-pole plot shown in FIG. 4a, the ISI distortions originate from a common second order PLL this is characterized in the time continuous domain by a double zero at DC, one pole at the cut-off frequency, and one low frequency pole, originating from the stabilizing PLL open-loop zero. In the zero-pole plot shown in FIG. 4a, the double zero at DC is mapped in the discrete time domain (Z-plane) to a pair of distinct zeros, one perfectly at DC (i.e., Z is equal to 1), one outside of the unit circle and a pair of poles, one low-frequency PLL pole mapped inside the circle, which is the dominant pole with the lowest time constant, and the cut-off pole whose position depends on the cut-off frequency and the sample rate. Because one zero is outside the unit circle, the PLL transfer cannot be inverted with a stable filter. However since the zero at DC is desired for the differentiation, and the zero-pole pair close to DC can be shown to mostly compensate each other, equalizing only the cut-off frequency pole can transform the PLL transfer into that of a pure discrete-time differentiator, with good approximation. In the zero-pole plot shown in FIG. 4b, the low-frequency PLL pole (i.e., the dominant pole) is compensated (i.e., removed) by the receiver filter. The validity of this approximation is shown in FIG. 5, where an example 100 kHz bandwidth PLL at a symbol rate of 1.7 MHz yields a very small error with respect to an ideal differentiation on the symbol phases. Specifically, the maximum residual error in FIG. 5 is 0.3 degree (DEG), which is much smaller than a typical residual error of 1.5 DEG, which is obtained with a traditional approach using a low bandwidth PLL and a pure discrete-time digital differentiator.

Figure 6:
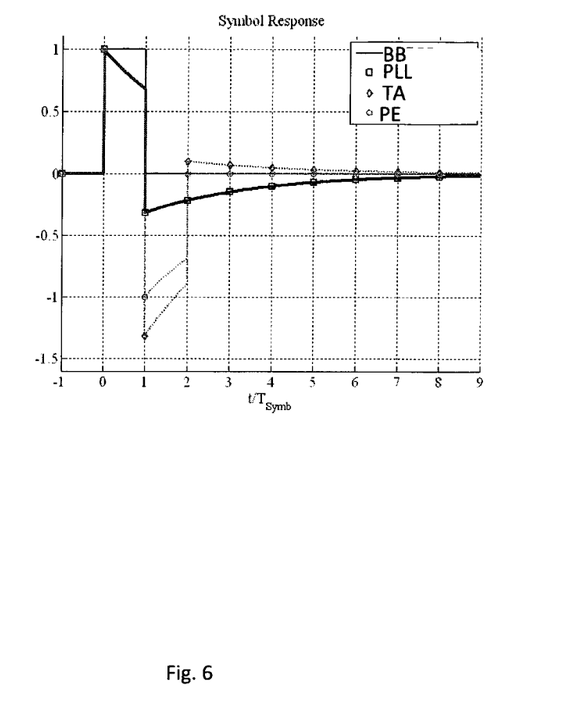
FIG. 6 shows some examples of system transient responses.

FIG. 6 shows examples of system transient responses of a baseband signal, "BB," the output signal of an HPF that is implemented as a PLL, "PLL," the traditional approach of decreasing the ISI by cascading a digital differentiator, "TA," and the output signal of the receiver filter 316 that is implemented as a PLL equalizer, "PE." The baseband signal, "BB," is a non-return-to-zero (NRZ) baseband that has a PLL bandwidth of 100 kHz. The HPF transient signal, "PLL," has a transient tail, which originates the ISI. Similar to the HPF transient signal, "PLL," the signal, "TA," also has a transient tail, although smaller than the transient signal, "PLL." In contrast with the HPF transient signal, "PLL" and the differentiated signal, "TA," the signal, "PE," has virtually zero transient because the receiver filter transforms the NRZ pulse into a differential pulse and removes all the ISI originating from the PLL.

Figure 7:
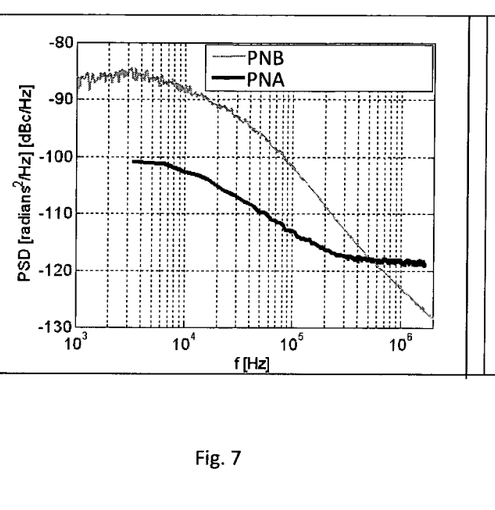
FIG. 7 shows the phase noise (PN) power spectrum before and after the receiver filter depicted in FIG. 3.

In addition to removing ISI, using the receiver filter 316 to provide a digital compensation can significantly reduce phase noise and shape the noise power spectrum. FIG. 7 depicts the phase noise (PN) power spectrum before the receiver filter 316, "PNB," and the PN power spectrum, "PNA," after the receiver filter 316. In the embodiment depicted in FIG. 7, the receiver filter 316 is implemented as a PLL equalizer. As depicted in FIG. 7, the PLL equalizer significantly lowers the phase noise amplitude at low frequencies and whitened its shape. Specifically, the phase noise is mostly at low frequencies and rapidly declines for frequencies that are higher than the PLL cut off frequency. Because the PLL Equalizer attenuates the most phase noise at low frequencies, the PLL equalizer reduces the phase noise in the frequencies where the phase noise is highest. In the example shown in FIG. 7, the root mean square (rms) value of the integrated phase noise is reduced by 10 dB. In addition, the PLL equalizer results in a whitened output noise, which is a desirable property for a subsequent adaptive equalizer that is used to further compensate for channel distortions.

Figure 8:
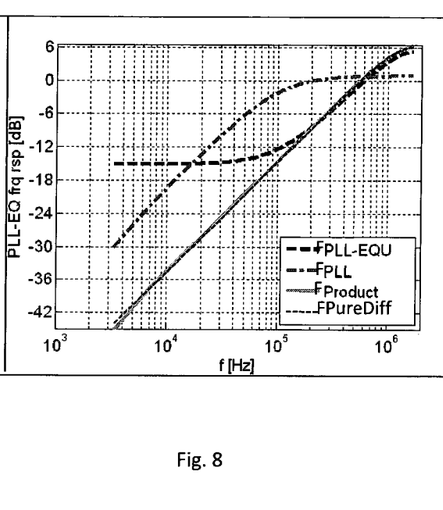
FIG. 8 depicts some examples of a frequency response of a discrete-time differentiator obtained by equalizing an analog HPF and a frequency response of a pure discrete-time differentiator.

FIG. 8 depicts some examples of a frequency response, "FPLL," of the HPF that is implemented as a phase lock loop (PLL), a frequency response, "FPLL-EQU," of the receiver filter 316 that is implemented as a PLL equalizer, a frequency response, "FProduct," of the resulting PLL equalized response, and a frequency response, "FPureDiff," of a pure differentiator. As shown in FIG. 8, the resulting PLL equalized response almost perfectly overlaps onto that of a pure differentiator. In addition, below the cut-off frequency (e.g., 100 kHz), the PLL equalizer attenuates the phase noise by 15 dB. Additionally, the PLL equalizer introduces less quantization noise than a pure differentiator because the equalizer tap value b1 is by definition smaller than unity.

Figure 9:
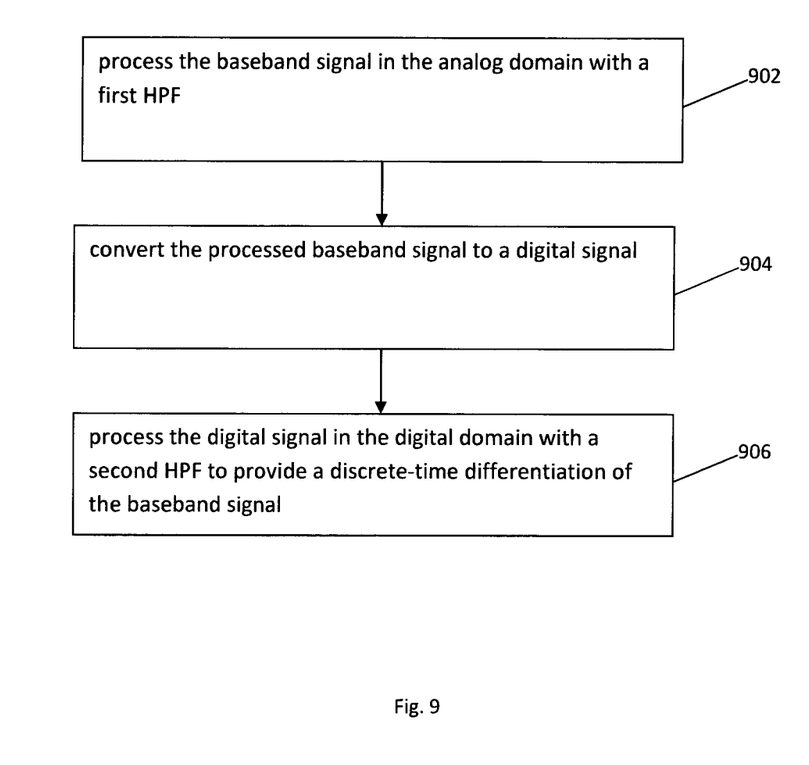
FIG. 9 is a process flow diagram that illustrates a method for processing a baseband signal in a DC suppressed system in accordance with an embodiment of the invention.

FIG. 9 is a process flow diagram that illustrates a method for processing a baseband signal in a DC suppressed system in accordance with an embodiment of the invention. At block 902, the baseband signal is processed in the analog domain with a first HPF. At block 904, the processed baseband signal is converted to a digital signal. At block 906, the digital signal is processed in the digital domain with a second HPF to provide a discrete-time differentiation of the baseband signal.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for processing a baseband signal in a Direct Current (DC)-suppressed system, the method comprising:
processing the baseband signal in the analog domain with a first high pass filter (HPF);
converting the processed baseband signal to a digital signal; and
processing the digital signal in the digital domain with a second HPF to provide a discrete-time differentiation of the baseband signal, wherein processing the digital signal in the digital domain with the second HPF comprises compensating only the dominant pole of a transfer function of the first HPF by filtering the digital signal in the digital domain using a single zero finite impulse response (FIR) filter with a single tap delay and a single coefficient.

2. The method of claim 1, further comprising:
receiving a wireless signal at an antenna of the DC-suppressed system; and
demodulating the wireless signal into the baseband signal.

3. The method of claim 2, wherein the DC-suppressed system is a smart card.

4. The method of claim 3, wherein receiving the wireless signal comprises receiving the wireless signal from a smart card reader.

5. The method of claim 1, wherein processing the digital signal in the digital domain with the second HPF comprises generating an output signal, wherein the output signal is a discrete-time differentiated version of the baseband signal.

6. The method of claim 1, wherein processing the digital signal in the digital domain with the second HPF comprises filtering the digital signal in the digital domain using a receiver filter.

7. The method of claim 1, wherein the FIR filter comprises a delay element, a multiplier, and an adder.

8. The method of claim 1, wherein the DC-suppressed system is a phase-shift keying (PSK) demodulation system.

9. The method of claim 8, further comprising:
receiving a wireless signal at an antenna of the PSK demodulation system; and
demodulating the wireless signal into the baseband signal using a PSK demodulator.

10. The method of claim 9, wherein processing the baseband signal in the analog domain with the first HPF comprises processing the baseband signal using a phase lock loop (PLL).

11. The method of claim 10, wherein processing the digital signal in the digital domain with the second HPF comprises performing differentiation on the digital signal in the digital domain using a PLL equalizer.

12. A system for processing a baseband signal in a Direct Current (DC)-suppressed system, the system comprising:
a first high pass filter (HPF) configured to process the baseband signal in the analog domain;
an analog-to-digital converter (ADC) configured to convert the processed baseband signal to a digital signal; and
a second HPF configured to process the digital signal in the digital domain to provide a discrete-time differentiation of the baseband signal, wherein the second HPF comprises a digital single zero finite impulse response (FIR) filter with a single tap delay and a single coefficient configured to compensate only the dominant pole of a transfer function of the first HPF.

13. The system of claim 12, wherein a wireless signal is received at an antenna of the DC-suppressed system, and wherein the wireless signal is demodulated into the baseband signal.

14. The system of claim 12, wherein the DC-suppressed system is a smart card.

15. A smart card comprising:
an antenna configured to receive a wireless signal;
an analog front-end configured to process the wireless signal and to convert the wireless signal into a digital signal;
a digital signal processing (DSP) unit configured to perform digital signal processing on the digital signal; and
a processor configured to process the digital signal from the DSP unit according to one or more protocols,
wherein the analog front-end comprises:
a demodulator configured to demodulate the wireless signal into a baseband signal;
a first high pass filter (HPF) configured to process the baseband signal in the analog domain; and
an analog-to-digital converter (ADC) configured to convert the processed baseband signal to the digital signal,
and wherein the DSP unit comprises a second HPF configured to process the digital signal in the digital domain to provide a discrete-time differentiation of the baseband signal, wherein the second HPF comprises a digital single zero finite impulse response (FIR) filter with a single tap delay and a single coefficient configured to compensate only the dominant pole of a transfer function of the first HPF.

* * * * *